(12) United States Patent
Robinson et al.

(10) Patent No.: US 8,509,563 B2
(45) Date of Patent: Aug. 13, 2013

(54) GENERATION OF DOCUMENTS FROM IMAGES

(75) Inventors: Merle Michael Robinson, Redmond, WA (US); Matthieu T. Uyttendaele, Seattle, WA (US); Zhengyou Zhang, Bellevue, WA (US); Patrice Y. Simard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1435 days.

(21) Appl. No.: 11/275,908

(22) Filed: Feb. 2, 2006

(65) Prior Publication Data

US 2007/0177183 A1    Aug. 2, 2007

(51) Int. Cl.
*G06K 9/36* (2006.01)
*G06K 9/20* (2006.01)
*H04N 1/04* (2006.01)

(52) U.S. Cl.
USPC ............................ 382/284; 382/321; 358/474

(58) Field of Classification Search
USPC ........................................................ 382/284
See application file for complete search history.

(56) References Cited

U.S. PATENT DOCUMENTS

| | | | | |
|---|---|---|---|---|
| 4,040,009 A * | 8/1977 | Kadota et al. | ................. | 382/227 |
| 5,020,112 A | 5/1991 | Chou | | |
| 5,235,650 A | 8/1993 | Jeong | | |
| 5,373,566 A | 12/1994 | Murdock | | |
| 5,432,868 A | 7/1995 | Obata | | |
| 5,440,662 A | 8/1995 | Sukkar | | |
| 5,442,715 A | 8/1995 | Gaborski | | |
| 9,479,523 | 12/1995 | Gaborski | | |
| 5,511,148 A * | 4/1996 | Wellner | ......................... | 358/1.6 |
| 5,579,436 A | 11/1996 | Chou | | |
| 5,594,676 A | 1/1997 | Greggain | | |
| 5,625,707 A | 4/1997 | Diep | | |
| 5,625,748 A | 4/1997 | McDonough | | |
| 5,627,942 A | 5/1997 | Nightingale | | |
| 5,649,032 A | 7/1997 | Burt | | |
| 5,680,479 A * | 10/1997 | Wang et al. | ................... | 382/176 |
| 5,687,286 A | 11/1997 | Bar-Yam | | |
| 5,749,066 A | 5/1998 | Nussbaum | | |
| 5,787,194 A | 7/1998 | Yair | | |
| 5,818,977 A | 10/1998 | Tansley | | |
| 5,832,435 A | 11/1998 | Silverman | | |

(Continued)

FOREIGN PATENT DOCUMENTS

| | | |
|---|---|---|
| JP | 06-215184 | 8/1994 |
| JP | 2002-133389 | 5/2002 |

(Continued)

OTHER PUBLICATIONS

Adobe Acrobat 7.0 professional, Jan. 2005.*

(Continued)

*Primary Examiner* — Randolph I Chu
(74) *Attorney, Agent, or Firm* — L. Alan Collins; Collins & Collins Intellectual, LLC (57) ABSTRACT

A system for generating soft copy (digital) versions of hard copy documents uses images of the hard copy documents. The images may be captured using a device suitable for capturing images, like a camera phone. Once available, the images may be processed to improve their suitability for document generation. The images may then be processed to recognize and generate soft copy versions of the documents represented by the images.

18 Claims, 3 Drawing Sheets

(56) References Cited

U.S. PATENT DOCUMENTS

| | | | |
|---|---|---|---|
| 5,920,477 A * | 7/1999 | Hoffberg et al. | 382/181 |
| 5,930,746 A | 7/1999 | Ting | |
| 5,943,443 A | 8/1999 | Itonori et al. | |
| 5,960,397 A | 9/1999 | Rahim | |
| 5,987,171 A | 11/1999 | Wang | |
| 6,011,558 A | 1/2000 | Hsieh | |
| 6,011,634 A * | 1/2000 | Aihara et al. | 358/468 |
| 6,041,299 A | 3/2000 | Schuster | |
| 6,076,057 A | 6/2000 | Narayanan | |
| 6,097,854 A | 8/2000 | Szeliski | |
| 6,157,747 A | 12/2000 | Szeliski | |
| 6,178,398 B1 | 1/2001 | Peterson | |
| 6,246,413 B1 | 6/2001 | Teo | |
| 6,259,826 B1 | 7/2001 | Pollard | |
| 6,363,171 B1 | 3/2002 | Kovacs | |
| 6,377,704 B1 | 4/2002 | Cooperman | |
| 6,393,054 B1 | 5/2002 | Altunbasak | |
| 6,542,635 B1 | 4/2003 | Hu | |
| 6,559,846 B1 | 5/2003 | Uyttendaele | |
| 6,587,587 B2 | 7/2003 | Altman | |
| 6,597,801 B1 | 7/2003 | Cham | |
| 6,636,216 B1 | 10/2003 | Silverbrook | |
| 6,650,774 B1 | 11/2003 | Szeliski | |
| 6,677,981 B1 | 1/2004 | Mancuso | |
| 6,678,415 B1 | 1/2004 | Popat | |
| 6,687,400 B1 | 2/2004 | Szeliski | |
| 6,701,030 B1 | 3/2004 | Uyttendaele | |
| 6,714,249 B2 | 3/2004 | May et al. | |
| 6,766,320 B1 | 7/2004 | Wang | |
| 6,782,505 B1 | 8/2004 | Miranker | |
| 6,813,391 B1 | 11/2004 | Uyttendaele | |
| 6,930,703 B1 | 8/2005 | Hubel et al. | |
| 6,950,753 B1 | 9/2005 | Rzhetsky | |
| 6,985,620 B2 | 1/2006 | Sawhney | |
| 6,996,295 B2 | 2/2006 | Tyan | |
| 7,010,158 B2 | 3/2006 | Cahill | |
| 7,046,401 B2 * | 5/2006 | Dufaux et al. | 358/450 |
| 7,107,207 B2 | 9/2006 | Goodman | |
| 7,126,630 B1 | 10/2006 | Lee | |
| 7,142,723 B2 | 11/2006 | Kang | |
| 7,184,091 B2 * | 2/2007 | Matsuda et al. | 348/369 |
| 7,197,497 B2 | 3/2007 | Cossock | |
| 7,239,805 B2 | 7/2007 | Uttendaele | |
| 7,327,883 B2 | 2/2008 | Polonowski | |
| 7,343,049 B2 * | 3/2008 | Butterworth | 382/284 |
| 7,460,730 B2 | 12/2008 | Pal | |
| 7,471,830 B2 * | 12/2008 | Lim et al. | 382/181 |
| 1,030,881 A1 | 12/2009 | Viola | |
| 8,249,344 B2 | 8/2012 | Viola | |
| 2001/0014229 A1 * | 8/2001 | Nakata et al. | 399/82 |
| 2001/0019636 A1 * | 9/2001 | Slatter | 382/284 |
| 2002/0010719 A1 * | 1/2002 | Kupiec | 707/526 |
| 2002/0099542 A1 * | 7/2002 | Mitchell et al. | 704/231 |
| 2002/0106124 A1 * | 8/2002 | Wang | 382/173 |
| 2002/0113805 A1 | 8/2002 | Li | |
| 2002/0140829 A1 | 10/2002 | Colavin | |
| 2002/0172425 A1 | 11/2002 | Venkatesan et al. | |
| 2002/0198909 A1 * | 12/2002 | Huynh et al. | 707/513 |
| 2003/0010992 A1 | 1/2003 | Lempkowski | |
| 2003/0103670 A1 | 6/2003 | Schoelkopf | |
| 2003/0110150 A1 | 6/2003 | O'Neil | |
| 2003/0169925 A1 | 9/2003 | Polonowski | |
| 2003/0171915 A1 | 9/2003 | Barklund | |
| 2003/0194149 A1 | 10/2003 | Sobel | |
| 2003/0210817 A1 | 11/2003 | Hullender | |
| 2003/0215138 A1 | 11/2003 | Raghupathy | |
| 2003/0215139 A1 | 11/2003 | Shilman | |
| 2003/0215145 A1 | 11/2003 | Shilman | |
| 2003/0222984 A1 | 12/2003 | Zhang | |
| 2003/0234772 A1 | 12/2003 | Zhang et al. | |
| 2004/0006742 A1 | 1/2004 | Slocombe | |
| 2004/0111408 A1 | 6/2004 | Caudill | |
| 2004/0114799 A1 | 6/2004 | Xu | |
| 2004/0141648 A1 | 7/2004 | Dodge | |
| 2004/0165786 A1 | 8/2004 | Zhang et al. | |
| 2004/0167778 A1 | 8/2004 | Valsan | |
| 2004/0181749 A1 | 9/2004 | Chellapilla et al. | |
| 2004/0186714 A1 | 9/2004 | Baker | |
| 2004/0189674 A1 | 9/2004 | Zhang et al. | |
| 2004/0218799 A1 * | 11/2004 | Mastie et al. | 382/137 |
| 2004/0233274 A1 | 11/2004 | Uyttendaele | |
| 2005/0013501 A1 | 1/2005 | Kang | |
| 2005/0015251 A1 | 1/2005 | Pi | |
| 2005/0036681 A1 * | 2/2005 | Lenoir | 382/176 |
| 2005/0044106 A1 | 2/2005 | Duncan | |
| 2005/0055641 A1 * | 3/2005 | Machida | 715/734 |
| 2005/0104902 A1 | 5/2005 | Zhang et al. | |
| 2005/0111737 A1 | 5/2005 | Das | |
| 2005/0125746 A1 | 6/2005 | Viola et al. | |
| 2005/0154979 A1 | 7/2005 | Chidlovskii | |
| 2005/0168623 A1 | 8/2005 | Stavely | |
| 2005/0169555 A1 * | 8/2005 | Hasegawa | 382/284 |
| 2005/0185047 A1 | 8/2005 | Hii | |
| 2005/0200921 A1 | 9/2005 | Yuan et al. | |
| 2005/0201634 A1 | 9/2005 | Yuan et al. | |
| 2005/0210046 A1 * | 9/2005 | Brunecky | 707/100 |
| 2005/0259866 A1 | 11/2005 | Jacobs et al. | |
| 2006/0033963 A1 * | 2/2006 | Nishida | 358/462 |
| 2006/0039610 A1 * | 2/2006 | Cantral | 382/190 |
| 2006/0041605 A1 * | 2/2006 | King et al. | 707/205 |
| 2006/0045337 A1 | 3/2006 | Shilman et al. | |
| 2006/0050969 A1 | 3/2006 | Shilman et al. | |
| 2006/0053097 A1 * | 3/2006 | King et al. | 707/3 |
| 2006/0085740 A1 | 4/2006 | Ye | |
| 2006/0088214 A1 | 4/2006 | Handley | |
| 2006/0095248 A1 | 5/2006 | Menezes | |
| 2006/0120624 A1 | 6/2006 | Jojic | |
| 2006/0177150 A1 | 8/2006 | Uttendaele | |
| 2006/0224610 A1 | 10/2006 | Wakeam | |
| 2006/0230004 A1 | 10/2006 | Handley | |
| 2006/0245641 A1 | 11/2006 | Viola | |
| 2006/0245654 A1 | 11/2006 | Viola | |
| 2006/0253273 A1 | 11/2006 | Feldman | |
| 2006/0280370 A1 | 12/2006 | Viola | |
| 2007/0003147 A1 | 1/2007 | Viola | |
| 2007/0016514 A1 * | 1/2007 | Al-Abdulqader et al. | 705/37 |
| 2007/0018858 A1 | 1/2007 | McCanne | |
| 2007/0031062 A1 | 2/2007 | Pal | |
| 2007/0055662 A1 | 3/2007 | Edelman | |
| 2007/0061415 A1 | 3/2007 | Emmett | |
| 2007/0150387 A1 * | 6/2007 | Seubert et al. | 705/31 |
| 2007/0177195 A1 * | 8/2007 | Rebert et al. | 358/1.15 |
| 2007/0222770 A1 | 9/2007 | Silverbrook | |
| 2008/0147790 A1 * | 6/2008 | Malaney et al. | 709/203 |
| 2010/0033765 A1 * | 2/2010 | Fan et al. | 358/449 |
| 2011/0066424 A1 * | 3/2011 | Kurzweil et al. | 704/9 |

FOREIGN PATENT DOCUMENTS

| | | |
|---|---|---|
| JP | 2002-269499 | 9/2002 |
| RU | 2 234 126 | 8/2004 |
| RU | 2 234 734 | 8/2004 |
| WO | WO 97/39420 | 10/1997 |
| WO | WO 02/099545 | 12/2002 |

OTHER PUBLICATIONS www.archive.org archived web page for http://www.panoramio.com/help on Feb. 6, 2006.*

"ABBYY FineReader 8.0 Redefines OCR Accuracy and Performance; Intelligent Recognition Enhancements," Aug. 29, 2005, Market Wire.

"Photovista Panorama—The world's leading 360° panorama software," retrieved Sep. 7, 2005, Iseemedia, http://www.iseemedia.com/main/products/photovista/panorama.

Zhang and He, "Notetaking with a Camera: Whiteboard Scanning and Image Enhancement," Proceedings of IEEE ICASPP, 2004, http://research.microsoft.com/users/lhe/.

"Product Features: (PanoWorx Only Features)," retrieved Sep. 7, 2005, http://www.vrtoolbox.com/vrpanoworx.html.

Block, "scanR lets you copy, scan with your cameraphone," Jan. 5, 2006, Engadget.com, http://engadget.com/2006/01/05/scanr-lets-you-copy-scan-with-your-cameraphone.

Graham-Rowe, "Camera phones will be high-precision scanners," Sep. 14, 2005, NewScientist.com News Service, http://www.newscientist.com.
Patterson, "Features of Samsung MM-A800", Jul. 20, 2005, Cnet.com, http://reviews.cnet.com.
"ambiguous grammar", Feb. 2, 2001.
Blostein, "Applying Compiler Techniques to Diagram Recognition", Aug. 11-15, 2002.
Borkar, "Automatically Extracting Structure from Free Text Addresses", Bulletin of the IEEE Computer Society Technical Committee on Data Engineering, Dec. 2000.
Bouckaert, "Low level information extraction: a Bayesian network based approach", In Proceedings of TextML, Jul. 2002.
Breuel, "High Performance Document Layout Analysis", Symposium on Document Image Understanding Technology (SDIUT03), Apr. 9-11, 2003.
Cardie, "Proposal for an Interactive Environment for Information Extraction", Cornell University Computer Science Technical Report TR98-1702, Jul. 6, 1998.
Caruana, "High Predsion Information Extraction", KDD-2000 Workshop on Text Mining, Aug. 20-23, 2000.
Chan, "Mathematical expression recognition: a survey", International Journal on Document Analysis and Recognition, Jun. 12, 2000.
Charniak, "Edge-Based Best-First Chart Parsing*", May 1, 1998.
Charniak, "Statistical Techniques for Natural Language Parsing", Aug. 7, 1997.
Chou, "Recognition of Equations Using a Two-Dimensional Stochastic Context-Free Grammar", SPIE vol. 1199 Visual Communications and Image Processing IV, Nov. 1, 1989.
Collins, "Discriminative Training Methods for Hidden Markov Models: Theory and Experiments with Perceptron Algorithms", Proceedings of the Conference on Empirical Methods in Natural Language Processing (EMNLP), Jul. 2002.
Conway, "Page Grammars and Page Parsing: A Syntactic Approach to Document Layout Recognition", Proceedings of the Second International Conference on Document Analysis and Recognition (ICDAR '93), Oct. 20-22, 1993.
Cortes, "Support-Vector Networks", Machine Learning, Mar. 8, 1995.
Freund, "A decision-theoretic generalization of on-line learning and an application to boosting", Appearing in the proceedings of the Second European Conference on Computational Learning Theory, Mar. 1995.
Freund, "Experiments with a New Boosting Algorithm", Machine Learning: Proceedings of the Thirteenth International Conference, Jul. 3-6, 1996.
Freund, "Large Margin Classification Using the Perceptron Algorithm", Machine Learning, Dec. 1999.
Hull, "Recognition of Mathematics Using a Two-Dimensional Trainable Context-free Grammar" Jun. 11, 1996.
Kanungo, "Stochastic Language Models for Style-Directed Layout Analysis of Document Images", IEEE Transactions on Image Processing, vol. 12, No. 5, May 2003.
Kay, "Algorithm Schemata and Data Structures in Syntactic Processing", Oct. 1980.
Kay, "Chart Generation", Proceedings of the 34th Annual Meeting of the Association for Computational Linguistics, Jun. 26, 1996.
Kim, "Automated Labeling in Document Images", Proc. SPIE vol. 4307, Document Recognition and Retrieval VIII, Jan. 20, 2001.
Klein, "A* Parsing: Fast Exact Viterbi Parse Selection", Proceedings of the Human Language Technology Conference of the North American Chapter of the Association for Computational Linguistics, May 27-Jun. 1, 2003.
Krisbnamoorthy, "Syntactic Segmentation and Labeling of Digitized Pages from Technical Journals", IEEE Transactions on Pattern Analysis and Machine intelligence, vol. 15, No. 7, Jul. 1993.
Kristjansson, "Interactive Information Extraction with Constrained Conditional Random Fields", American Association for Artificial Intelligence, Mar. 22-24, 2004.
Lafferty, "Conditional Random Fields: Probabilistic Models for Segmenting and Labeling Sequence Data", Proceedings of the Eighteenth International Conference on Machine Learning (ICML 2001), Jun. 28-Jul. 1, 2001.
Langley, "Learning Context-Free Grammars with a Simplicity Bias", Proceedings of the Eleventh European Conference on Machine Learning, May 31-Jun. 2, 2000.
Manning, "Foundations of Statistical Natural Language Processing", The MIT Press, 1999.
Mao, "Document Structure Analysis Algorithms: A Literature Survey", Proc. SPIE vol. 5010, Document Recognition and Retrieval X, Jan. 20, 2003.
Marcus, "The Penn Treebank: Annotating Predicate Argument Structure", Proceedings of the workshop on Human Language Technology, Mar. 8-11, 1994.
Matsakis, "Recognition of Handwritten Mathematical Expressions" May 21, 1999.
McCallum, "Early Results for Named Entity Recognition with Conditional Random Fields, Feature Induction and Web-Enhanced Lexicons", Proceedings of the Seventh Conference on Natural Language Learning at HLT-NAACL, May 27-Jun. 1, 2003.
McCallum, "Efficiently Inducing Features of Conditional Random Fields", Proceedings of the 19th Conference in Uncertainty in Artificial Intelligence, Aug. 7-10 2003.
Miller, "Ambiguity and Constraint in Mathematical Expression Recognition", Proceedings of the Fifteenth National Conference on Artificial Intelligence, Jul. 26-30, 1998.
Nigam, "Using Maximum Entropy for Text Classification", Machine Learning for Information Filtering at IJCAI, Aug. 1, 1999.
Niyogi, "Knowledge-Based Derivation of Document Logical Structure", Third International Conference on Document Analysis and Recognition, ICDAR, vol. 1, Aug. 14-15, 1995.
Phillips, "CD-ROM Document Database Standard", Second International Conference on Document Analysis and Recognition, ICDAR, Oct. 20-22, 1993.
Pinto, "Table Extraction Using Conditional Random Fields", Proceedings of the 26th Annual International ACM SIGIR Conference on Research and Development in Information Retrieval, Jul. 28-Aug. 1, 2003.
Rabiner, "A Tutorial on Hidden Markov Models and Selected Applications in Speech Recognition". Proceedings of the IEEE, vol. 77, No. 2, Feb. 1989.
Rozenknop, "Discriminative Models of SCFG and STSG", Seventh International Conference on Text, Speech and Dialogue, Sep. 8-11, 2004.
Scheer, "Active Hidden Markov Models for Information Extraction", Proceedings of the Fourth International Symposium on Intelligent Data Analysis, Sep. 13-15, 2001.
Sha, "Shallow Parsing with Conditional Random Fields", Human Language Technology Conference of the North American Chapter of the Association for Computational Linguistics, HLT-NAACL, May 27-Jun. 1, 2003.
Shilman, "Recognition and Grouping of Handwritten Text in Diagrams and Equations", Ninth International Workshop on Frontiers in Handwriting Recognition, IWFFIR, Oct. 26-29, 2004.
Shilman, "Spatial Recognition and Grouping of Text and Graphics", Eurographics Workshop on Sketch-Based interfaces and Modeling, Aug. 30-31, 2004.
Stylos, "Citrine: Providing Intelligent Copy-and-Paste", Proceedings of the 17th annual ACM Symposium on User Interface Software and Technology, UIST, Oct. 24-27, 2004.
Sutton, "Conditional Probabilistic Context-Free Grammars", Mar. 13, 2004.
Taskar, "Max-Margin Parsing", Proceedings of the 2004 Conference on Empirical Methods in Natural Language Processing, EMNLP, Jul. 25-26, 2004.
Tokuyasu, "Turbo recognition: a statistical approach to layout analysis", Proc. SPIE vol. 4307, Document Recognition and Retrieval VIII, Jan. 20, 2001.
Viola, "Rapid Object Detection using a Boosted Cascade of Simple Features", IEEE Computer Society Conference on Computer Vision and Pattern Recognition, Dec. 8-14, 2001.
Viswanathan, "Document Recognition: An Attribute Grammar Approach", Proc. SPIE vol. 2660, Document Recognition III, Mar. 1996.
Zanibbi, "A Survey of Table Recognition: Models, Observations, Transformations, and Inferences", Oct. 24, 2003.

Allan, "Challenges in Information Retrieval and Language Modeling", Report of a Workshop held at the Center for intelligent information Retrieval, University of Massachusetts Amherst, Sep. 2002.

Altun, "Discriminative Learning for Label Sequences via Boosting", Advances in Neural Information Processing Systems, Dec. 9-14, 2002.

Artieres, "Poorly Structured Handwritten Documents Segmentation using Continuous Probabilistc Feature Grammars", Proceedings of the Third International Workshop on Document Layout Interpretation and its Applications, Aug. 2, 2003.

Baecker, "A Principled Design for Scalable Internet Visual Communications with Rich Media, Interactivity, and Structured Archives", Proceedings of the 2003 conference of the Centre for Advanced Studies on Collaborative Research, Oct. 6-9, 2003.

Faloutsos, "FastMap: A Fast Algorithm for Indexing, Data-Mining and Visualization af Traditional and Multimedia Datasets", Proceedings of the 1995 ACM SIGMOD International Conference on Management of Data, May 22-25, 1995.

Golfarelli, "A Methodological Framework for Data Warehouse Design", DOLAP '98, ACM First International Workshop on Data Warehousing and OLAP, Nov. 7, 1998.

Hartigan, "The K-Means Algc.trithin", Clustering Algorithms, John Wiley & Sons, pp. 84-107, 1975.

He, "Multiscale Conditional Random Fields for Image Labeling", Proceedings of the 2004 IEEE Computer Society Conference on Computer Vision and Pattern Recognition, vol. 2, Jun. 27-Jul. 2, 2004.

"Hidden Markov Models", printed Sep. 23, 2004.

Jain, "Structure in On-line Documents", 6th International Conference on Document Analysis and Recognition, Sep. 10-13, 2001.

Liang, "An Optimization Methodology for Document Structure Extraction on Latin Character Documents", IEEE Transactions on Pattern Analysis and Machine intelligence, vol. 23, No. 7, Jul. 2001.

McCallum, "Maximum Entropy Markov Models for Information Extraction and Segmentation", Proceedings of the Seventeenth International Conference on Machine Learning, Jun. 29-Jul. 2, 2000.

Mittendorf, "Applying Probabilistic Term Weighting to OCR Text in the Case of a Large Alphabetic Library Catalogue", Proceedings of the 18th Annual International ACM SIGIR Conference on Research and Development in Information Retrieval, Jul. 9-13, 1995.

Moran, "Pen-Based Interaction Techniques for Organizing Material on an Electronic Whiteboard", Proceedings of the 10th Annual ACM Symposium on User Interface Software and Technology, Oct. 14-17, 1997.

Munson, "System Study of a Dial-Up Text Reading Service for the Blind", Proceedings of the ACM annual conference, vol. 1, Aug. 1972.

Navarro, "A Guided Tour to Approximate String Matching", ACM Computing Surveys, vol. 33, No. 1, Mar. 2001.

Ruthruff, "End-User Software Visualizations for Fault Localization", ACM Symposium on Software Visualization, Jun. 11-13, 2003.

Sazaklis, "Geometric Decision Trees for Optical Character Recognition", Proceedings of the Thirteenth Annual Symposium on Computational Geometry, Jun. 4-6, 1997.

Schilit, "Beyond Paper: Supporting Active Reading with Free Form Digital Ink Annotations", Proceeding of the CHI'98 Conference on Human Factors in Computing Systems, Apr. 18-23, 1998.

Shilman, "Statistical Visual Language Models for Ink Parsing", In the 2002 AAAI Spring Symposium, Mar. 25-27, 2002.

Shilman, "Discerning Structure from Freeform Handwritten Notes", Proceedings of the Seventh International Conference on Document Analysis and Recognition, vol. 1, Aug. 3-6, 2003.

Taskar, "Max-Margin Markov Networks", In Advances in Neural Information Processing Systems 16, Dec. 8-13, 2003.

Voss, "Concept Indexing", international Conference on Supporting Group Work, Nov. 14-17, 1999.

Wallach, "Conditional Random Fields: An Introduction", University of Pennsylvania CIS Technical Report MS-CIS-04-21, Feb. 24, 2004.

Whittaker, "SCAN: Designing and evaluating user interfaces to support retrieval from speech archives", Proceedings of the 22nd Annual International ACM SIGIR Conference on Research and Development in Information Retrieval, Aug. 15-19, 1999.

Ye, "Learning to Parse Hierarchical Lists and Outlines using Conditional Random Fields", Proceedings of the 9th International Workshop on Frontiers in Handwriting Recognition, Oct. 26-29, 2004.

Yoshida, "Development of an Optical Character Film Reader", Review of the Electrical Communication Laboratories, vol. 23, Nos. 11-12, Nov.-Dec. 1975.

Agarwala, "Interactive Digital Photomontage", in ACM Transactions on Graphics (TOG), vol. 23, No. 3, Aug. 8-12, 2004.

Boykov, "Fast Approximate Energy Minimization via Graph Cuts", IEEE Transactions on Pattern Analysis and Machine Intelligence (TPAMI), vol. 23, No. 11, Nov. 2001.

Davis, "Mosaics of Scenes with Moving Objects", IEEE Conference on Computer Vision and Pattern Recognition (CVPR'98), Jun. 23-25, 1998.

Durand, "Fast Bilateral Filtering for the Display of High-Dynamic-Range Images", in ACM Transactions on Graphics (TOG), vol. 21, No. 3, Jul. 2002.

Fattal, "Gradient Domain High Dynamic Range Compression", in ACM Transactions on Graphics (TOG), vol. 21, No. 3, Jul. 2002.

Kolmogorov, "What Energy Functions Can Be Minimized via Graph Cuts?", IEEE Transactions on Pattern Analysis and Machine Intelligence (TPAMI), vol. 26, No. 2, Feb. 2004.

Levin, "Seamless Image Stitching in the Gradient Domain", Eighth European Conference on Computer Vision (ECCV 2004), vol. 4, May 11-14, 2004.

Mann, "On being 'undigital' with digital cameras: Extending Dynamic Range by Combining Differently Exposed Pictures", IS&T's 48th Annual Conference, May 7-11, 1995.

Mitsunaga, "Radiometric Self Calibration", IEEE Conference on Computer Vision and Pattern Recognition (CVPR '99), vol. 2, Session 2-C, Jun. 23-25, 1999.

Pal, "Probability Models for High Dynamic Range Imaging", IEEE Conference on Computer Vision and Pattern Recognition (CVPR 2004), vol. 2, Jun. 27-Jul. 2, 2004.

Perez, "Poisson Image Editing", in ACM Transactions on Graphics (TOG), vol. 22, No. 3, Papers from SIGGRAPH 2003, Jul. 28-31, 2003.

Reinhard, "Photographic Tone Reproduction for Digital Images", in ACM Transactions on Graphics (TOG), vol. 21, No. 3, Jul. 2002.

Tsin, "Statistical Calibration of CCD Imaging Process", IEEE International Conference on Computer Vision (ICCV 2001), vol. 1, Jul. 7-14, 2001.

Uyttendaele, "Eliminating Ghosting and Exposure Artifacts in Image Mosaics", IEEE Conference on Computer Vision and Pattern Recognition (CVPR 2001), vol. 2, Dec. 8-14, 2001.

Bergen, "Hierarchical Model-Based Motion Estimation", Second European Conference on Computer Vision (ECCV'92), May 19-22, 1992.

Bogoni, "Extending Dynamic Range of Monochrome and Color images through Fusion", Proceedings of the 15th International Conference on Pattern Recognition (ICPR 2000), vol. 3, Sep. 3-7, 2000.

Lucas, "An iterative image Registration Technique with an Application to Stereo Vision", Proceedings of the 14th DARPA Imaging Understanding Workshop, Apr. 21-23, 1981.

Mann, "Painting with Looks: Photographic: images from Video Using Quantimetric Processing", Proceedings of the 10th ACM International Conference on Multimedia 2002, Dec. 1-6, 2002.

Nayar, "High Dynamic Range Imaging: Spatially Varying Pixel Exposures", Conference on Computer Vision and Pattern Recognition (CVPR 2000), vol. 1, Jun. 13-15, 2000.

PCT International Search Report and Written Opinion for Application No. PCT/US06/26140, Reference 313210.05 WO, Jul. 23, 2007.

CN Notice on the Second Office Action for Application No, 200680031501.X, Apr. 6, 2011.

CN Notice on the Third Office Action for Application No. 200680031501.X, Aug. 22, 2011.

JP Notice of Rejection for Application No. 2008-520352, Dec. 2, 2011.

Chen, "Detecting and Reading Text in Natural Scenes", IEEE Computer Society Conference on Computer Vision and Pattern Recognition (CVPR), vol. 2, Jun. 27-Jul. 2, 2004.

Microsoft Press® Computer Dictionary, Second Edition, The Comprehensive Standard for Business, School, Library, and Home, 1994.

Namboodiri, "Robust Segmentation of Unconstrained Online Handwritten Documents", Proceedings of the Fourth Indian Conference on Computer Vision, Graphics & image Processing (ICVGIP), Dec. 16-18, 2004.

Brown, "Recognising Panoramas"; Proceedings of the Ninth IEEE International Conference on Computer Vision, Oct. 13-16, 2003.

Brown, "Multi-Image Matching using Multi-Scale Oriented Patches", Technical Report MSR-TR-2004-133, Dec. 2004.

Debevec, "Recovering High Dynamic Range Radiance Maps from Photographs", Proceedings of the 24th Annual Conference on Computer Graphics (SIGGRAPH '97), Aug. 3-8, 1997.

Irani, "Improving Resolution by Image Registration", CVGIP: Graphical Models and Image Processing, vol. 53, No. 3, May 1991.

Irani, "Recovery of Ego-Motion Using Image Stabilization", Proceedings of IEEE Conference on Computer Vision and Pattern Recognition, Jun. 21-23, 1994.

Irani, "Mosaic Based Representations of Video Sequences and Their Applications", Proceedings of the Fifth international Conference on Computer Vision (ICCV '95), Jun. 20-23, 1995.

Irani, "Video Indexing Based on Mosaic Representations"; Proceedings of the IEEE, May 1998.

Kang, "Characterization of Errors in Compositing Panoramic Images", Appears in Conference on Computer Vision and Pattern Recognition (CVPR '97), Jun. 1996.

Kang, "High Dynamic Range Video", ACM Transactions on Graphics, vol. 22, No. 3, Papers from SIGGRAPH, Jul. 28-31, 2003.

Koch; "Calibration of Hand-held Camera Sequences for Plenoptic Modeling", Proceedings of the 7th International Conference on Computer Vision (ICCV '99), Sep. 20-25, 1999.

Li, "Improved Video Mosaic Construction by Selecting a Suitable Subset of Video Images", Proceedings of the 27th Australasian Conference on Computer Science, Jan. 2004.

Mann, "Virtual bellows: Constructing High Quality Stills from Video", In the First IEEE International Conference on Image Processing (ICIP '94), vol. 1, Nov. 13-16, 1994.

Massey, "Salient stills: Process and practice", IBM Systems Journal, vol. 35, Nos. 3&4, 1996.

Nestér, "Frame Decimation for Structure and Motion", Second European Workshop on 3D Structure frorn Multiple Images of Large-Scale Environments (SMILE 2000), Jul. 12, 2000.

Peleg, "Panoramic Mosaics by Manifold Projection", Conference on Computer Vision and Pattern Recognition (CVPR '97), Jun. 17-19, 1997.

Sawhney, "Robust Video Mosaicing through Topology Inference and Local to Global Alignment", 5th European Conference on Computer Vision (ECCV '98), vol. 2, Jun. 2-6, 1998.

Sawhney, "VideoBrush™: Experiences with Consumer Video Mosaicing", Proceedings of the 4th IEEE Workshop on Applications of Computer Vision (WACV '98), Oct. 19-21, 1998.

Schodl, "Video Textures", Proceedings of the 27th Annual Conference on Computer Graphics (SIGGRAPH2000), Jul. 23-28, 2000.

Szeliski, "Video Mosaics for Virtual Environments", IEEE Computer Graphics and Applications, vol. 16, No. 2, Mar. 1996.

Szeliski, "Creating Full View Panoramic Image Mosaics and Environment Maps", Proceedings of the 24th Annual Conference on Computer Graphics (SIGGRAPH '97), Aug., 3-8, 1997.

Szeliski, "Image Alignment and Stitching: A Tutorial", Technical Report MSR-TR-2004-92, Sep. 27, 2004.

Triggs, "Bundle Adjustment—A Modern Synthesis", Vision Algorithms: Theory and Practice, International Workshop on Vision Algorithms (ICCV '99), Sep. 21-22, 1999.

Zhu, "Stereo Mosaics from a Moving Video Camera for Environmental Monitoring", First International Workshop on Digital and Computational Video, Dec. 10, 1999.

* cited by examiner

GENERATION OF DOCUMENTS FROM IMAGES

BACKGROUND

Information contained in hard copy documents—for example, in magazine articles, printed photographs, books, newspapers, and so on—cannot easily be used in a digital environment—for example, with a desktop or laptop computer, a phone or personal digital assistant (PDA), or a data network like the Internet. While some documents can be scanned or otherwise digitized to create a soft copy or digital document, the use of present devices, like scanners or photocopy machines, can be difficult and time-consuming enough that many people choose instead to re-enter data contained in hard copy documents by hand.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various technologies and techniques directed to generating soft copy (digital) documents using images of hard copy documents. More particularly, described herein are, among other things, systems, methods, and data structures that facilitate generation of soft copy documents from images.

Some implementations of the generation system described herein may include functionality for acquiring images, like, for example, a digital camera, including a mobile telephone that incorporates a camera. Once the necessary images have been acquired, the system may combine or improve the suitability of the images for later use through one or more techniques. The system may also determine the type of document or documents represented by the image or images. The system may recognize a variety of elements in the images, including text, tables, diagrams, and so on. Given multiple possibilities for recognized entities, the system may present a user with selectable choices, so the user can influence the nature of the elements that are recognized. Ultimately, the system may generate one or more types of soft copy documents, such as word processor documents, spreadsheets, and so on.

DETAILED DESCRIPTION

Described herein are various technologies and techniques directed to generating soft copy (digital) documents using images of hard copy documents. More particularly, described herein are, among other things, systems, methods, and data structures that facilitate generation of soft copy documents from images.

With one embodiment, a user might take a number of photographs of a magazine article using a camera phone. The document generation system might then process the acquired digital images to, for example, remove shadows that could make document generation more difficult. The system might then combine the images to create a single composite image for each page of the magazine article, and then recognize elements in each image. In the case of a magazine article, the recognized elements might include text, graphics, tabular data, and photographs with captions. Using the recognized elements, the system might generate a single word processor document with multiple pages containing text, graphics, tables, and photographs. Furthermore, the recognized elements might be represented as distinct elements themselves, rather than just as text. For example, tabular data might be represented using a word processor table rather than just as text separated by white space.

Example Computing Environment

Figure 1:
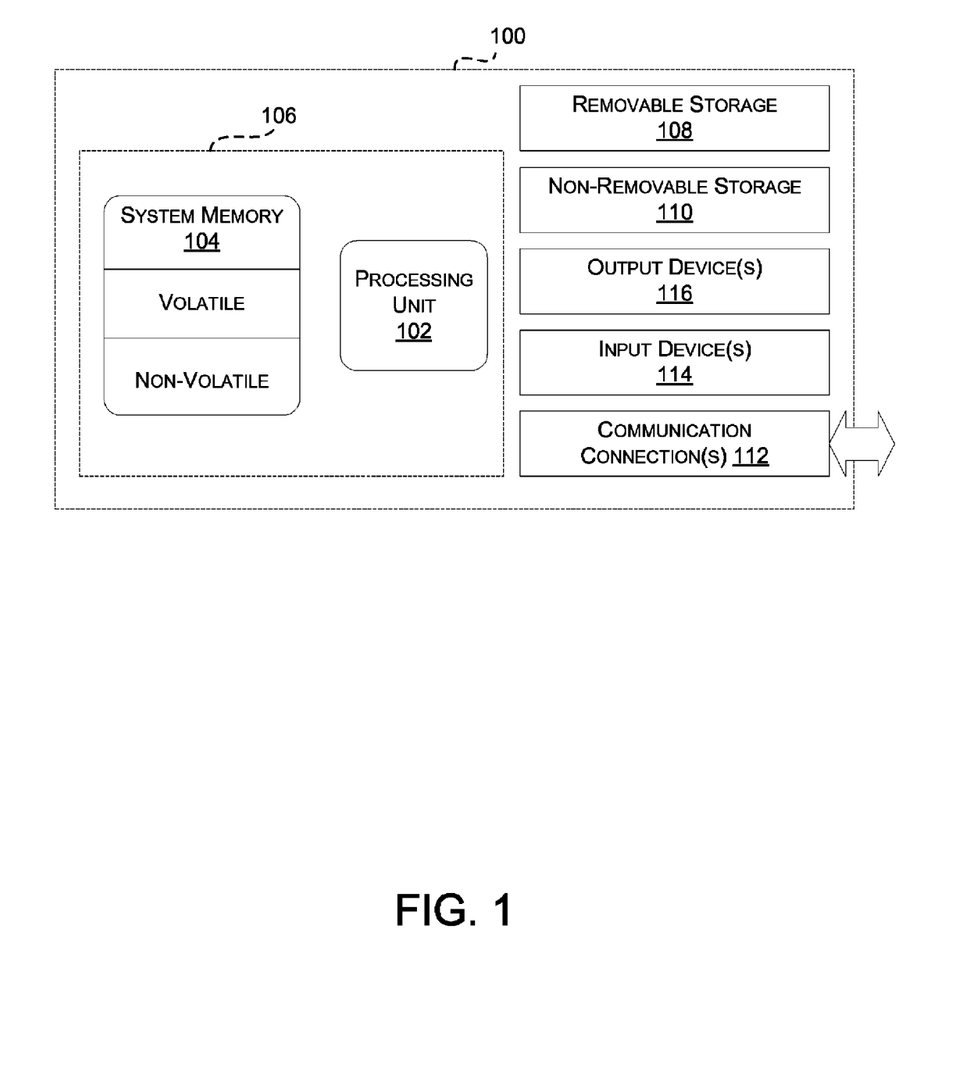
FIG. 1 is an illustration of an exemplary computing device in which the various technologies described herein may be implemented.

FIG. 1 and the related discussion are intended to provide a brief, general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 100 illustrated in FIG. 1.

Generally, program modules include routines, programs, objects, components, data structures, etc., that perform particular tasks or implement particular abstract data types. Tasks performed by the program modules are described below with the aid of one or more block diagrams and operational flowcharts.

Those skilled in the art can implement the description, block diagrams, and flowcharts in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

Turning now to FIG. 1, in its most basic configuration, the computing device 100 includes at least one processing unit 102 and memory 104. Depending on the exact configuration and type of computing device, the memory 104 may be volatile (such as RAM), non-volatile (such as ROM, flash memory, etc.), or some combination of the two. This most basic configuration is illustrated in FIG. 1 by dashed line 106. Additionally, the computing device 100 may also have additional features and functionality. For example, the computing device 100 may also include additional storage (removable and/or non-removable) including, but not limited to, magnetic or optical disks or tape. Such additional storage is illustrated in FIG. 1 by the removable storage 108 and the non-removable storage 110.

The computing device 100 may also contain one or more communications connection(s) 112 that allow the computing device 100 to communicate with other devices. The computing device 100 may also have one or more input device(s) 114 such as keyboard, mouse, pen, voice input device, touch input device, image input device (like a camera or scanner), etc. One or more output device(s) 116 such as a display, speakers, printer, etc. may also be included in the computing device 100.

Those skilled in the art will appreciate that the technologies described herein may be practiced with computing devices other than the computing device 100 illustrated in FIG. 1. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like.

The technologies described herein may also be implemented in distributed computing environments where tasks are performed by remote processing devices that are linked through a communications network. In a distributed computing environment, program modules may be located in both local and remote memory storage devices.

While described herein as being implemented in software, it will be appreciated that the technologies described herein may alternatively be implemented all or in part as hardware, firmware, or various combinations of software, hardware, and/or firmware.

Figure 2:
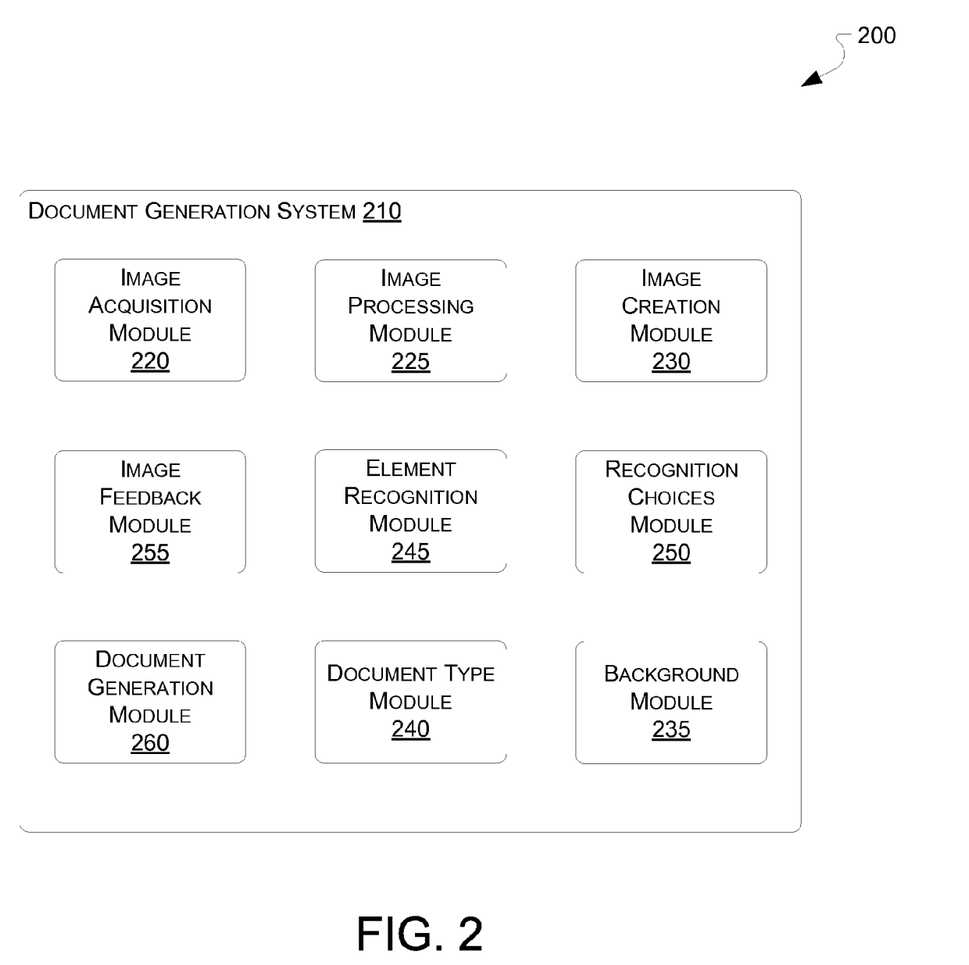
FIG. 2 is an illustration of an exemplary system in which generation of documents may be carried out.

Turning now to FIG. 2, illustrated therein is a system 200 in which generation of documents may be performed. Included in the system are a document generation system 210, an image acquisition module 220, an image processing module 225, an image creation module 230, an image feedback module 255, an element recognition module 245, a recognition choices module 250, a document type module 240, a document generation module 260, and a background module 235.

The document generation system 210 contains various modules, discussed below, that perform a variety of tasks to generate soft copy documents from digital images. It should be understood that while the document generation system 210 contains various modules, in one or more alternative implementations, a single module may perform more than one of the tasks associated with the modules in the system 210. For example, and without limitation, a single image module might perform the tasks associated with the image acquisition module 220, the image processing module 225, the image creation module 230 and the image feedback module 255. Similarly, in one or more alternative implementations, the modules may perform additional tasks not shown or discussed. Furthermore, in one or more alternative implementations, the modules may reside on more than one device or computer system. For example, and without limitation, the image acquisition module 220 and the image feedback module 255 might reside on one device, perhaps on a device with a camera, while the remaining modules reside on another device, perhaps on a device with a greater amount of computer processing ability. When more than one device is involved, the communication between the devices may be accomplished using a variety of methods, including by using a wireless connection of some kind, including Wi-Fi or cellular data such as GPRS, EV-DO, EDGE, HSDPA, or the like; by using a wired connection, including wired Ethernet, Firewire, and USB; or by any other communication mechanism with which computing devices may communicate. In addition, not all of the modules may be necessary to generate soft copy documents. For example, the document generation system may not provide feedback to the user while images are being acquired, and accordingly, the image feedback module 255 may not be required.

The image acquisition module 220 acquires one or more digital images of the hard copy document or documents from which the soft copy document or documents are to be generated. Generation of soft copy documents, including recognizing elements in images, requires sufficient resolution and image quality. Therefore, the number of images that must be acquired to generate documents depends generally on the resolution and quality of the images produced by the image acquisition module.

In some implementations, the image acquisition module 220 may include a digital camera. For example, the image acquisition module could be a mobile telephone with camera functionality, a PDA with camera functionality, or any other device that includes camera functionality. In the context of this application, "mobile telephone" should be understood to encompass any mobile device that includes telephony functionality, including devices traditionally known as mobile telephones, as well as PDAs, pagers, laptop computers, and the like, that include telephony functionality.

To acquire images, a user may take one or more photographs of each desired page or section of the hard copy document. Some camera devices may have sufficient resolution to enable element recognition with a single photograph of, say, a single page of the hard copy document. Other camera devices—including those included with many mobile telephones, and/or those without adjustable focus lenses—may generate a single image with insufficient detail to enable document generation. In such a case, the user may take multiple photographs, perhaps each of a different part of the hard copy document, so that all of the images, when considered together, provide enough detail to enable document generation. In general, it may be necessary for the captured images to display the text and other elements of the hard copy document in such detail that a person, while viewing the image, can read and understand the text and other elements. During testing, a camera with a resolution of two megapixels and an adjustable focus lens generated images of an 8.5"×11" page sufficient for further use. In some implementations, cameras with lower resolutions and/or without adjustable focus lenses may require multiple images of the same page or section. Other modules, including the image processing module 225 and the image creation module 230, may further process the images acquired by the image acquisition module so that other modules, including the element recognition module 245 and the document type module 240, may perform their associated tasks.

In other implementations, the image acquisition module 220 may be an image scanner, photocopy machine, facsimile machine, or other device that can create digital images. For example, an image scanner or photocopy machine may generate digital images by scanning pages of a hard copy document. A facsimile machine may similarly generate an image from a transmitted or received facsimile document. Depending on the quality and level of detail of the images generated by the scanner or other device, more than one image may be required to enable document generation, similar to how multiple images may be required with some digital camera devices, as explained previously.

The image acquisition module 220 may also be a device that can acquire images originally created on another device.

For example, the image acquisition module might comprise a computer connected to a digital camera via a USB cable or a computer connected over a network to another computer containing a library of images.

The image acquisition module may be used to acquire images of multiple pages or sections of the same hard copy document, or of different hard copy documents, independent of whether multiple images are acquired of the same page or section (for purposes of enabling document generation, as explained previously).

The image processing module 225 may perform various image enhancement processing operations on the images acquired using the image acquisition module 220. This processing may generally be directed toward improving the suitability of the images for document generation, including processing that increases the ability of or makes more efficient the operation of other modules, like the element recognition module 245 and the document type module 240.

In some implementations, including those where the image acquisition module 220 includes a digital camera, the images may have been created when the camera was not aligned correctly with the hard copy document. This misalignment may result in an image with "keystone effects," which in this context are image artifacts where angles in the image are different from angles in the hard copy. The image processing module 225 may remove keystone effects, and thereby improve the operation of other modules in the system, including the element recognition module 245.

In the same or other implementations, parts of the images may be in shadow because of, for example, uneven lighting when the image was created. The image processing module 225 may remove or lessen shadows in the images to improve the operation of other modules in the system. Removing keystone effects and shadows in images may be accomplished using various methods.

The image processing module 225 may also perform other image processing that improves the quality of images for use in other modules of the system, as are recognized in the art. Furthermore, some image processing may operate with one or more of the other modules. For example, some processing may be more efficiently or successfully performed when working with the image creation module 230, discussed below, or with the composite images that may be generated by the image creation module.

The image creation module 230 creates a composite digital image that represents a page or section of the hard copy document, or the entirety of the hard copy document. In some instances, for example when multiple images are acquired, the image creation module may join or "stitch together" the acquired images to create a single composite image. For example, in an implementation where the image acquisition module 220 includes a digital camera, a user may have taken multiple photographs of a single hard copy page so that text and other elements are readable in the images generated by the camera. In such a case, the image creation module may identify and stitch together the images that make up the same page, creating a single composite image of the entire hard copy page. Joining or stitching together the acquired images may be accomplished using various methods.

If images of multiple hard copy pages or sections have been captured using the image acquisition module, the image creation module 230 may recognize the hard copy page or section with which the image is associated and generate multiple composite images, one for each hard copy page or section.

In cases where a single acquired image is sufficient to enable element recognition, the composite image created by the image creation module 230 may be the same as the single acquired image, or the same as the acquired image suitably processed by the image processing module 225. Alternatively, in such cases, the image creation module may not be necessary, and other modules in the system may work directly with the acquired or processed image.

In a preferred embodiment, the operation of the image creation module 230 may be performed without user input. However, in some implementations and with some images, the image creation module may not be able to correctly link an image with a composite image. In such a case, the image creation module may present to the user of the system multiple choices and enable the user to link the image with the composite image, for example, by specifying where in the composite image the particular image should be used, or with which composite image the particular image should be associated.

It should be understood that, unless noted or understood otherwise, the modules and other parts of the invention described herein may work with images acquired directly from the image acquisition module 220, images processed by the image processing module 225, or from one or more composite images generated by the image creation module 230.

The image feedback module 255 provides feedback to the user while images are being acquired. In some implementations, including those where the image acquisition module 220 includes a digital camera, the image feedback module may indicate that images of some portions of the hard copy document have not been acquired. For example, where the left side of a hard copy page has been captured but the right side has not, the image feedback module may indicate that the user must still take one or more photographs of the right side of the page.

The image feedback module may provide feedback in multiple ways. In some implementations, the image feedback module may show graphically, for example on an LCD screen that is part of a digital camera or camera phone, which parts of the hard copy page or section have not been captured at all, or have not been captured with sufficient resolution. It may do so by displaying shaded regions, overlaid "on top" of the image of the hard copy document, that show the portions of the hard copy document that should still be captured.

The document type module 240 identifies the type of hard copy document, or the type of different portions of the hard copy document. It may work with the element recognition module 245 to enable the element recognition module to better recognize text and elements, and to enable the document generation system 210 to more accurately recreate a soft copy document from a hard copy document.

The document type module 240 may use multiple features or patterns of the image, images, or composite image to identify the type of document, or the types of sections of the document. Recognized types could include, without limitation, some or all of the following: word processor documents; spreadsheets; presentation documents; and forms, including forms like facsimile transmittal forms and business cards, and user-defined forms, for example for use with surveys. For additional information different kinds of recognized elements, refer to the following discussion of the element recognition module 245.

The element recognition module 245 recognizes a wide variety of elements in the image or composite image. These elements can then be used by the document generation system 210 to generate a soft copy document containing some or all of the recognized elements.

In one embodiment, the element recognition module 245 may simply recognize text, perhaps by implementing one or more optical character recognition (OCR) algorithms.

In the same or other embodiments, the element recognition module 245 may recognize additional "super-elements," aside from text. In this context, a "super-element" is an element that has some additional meaning or structure, beyond simple text. A super-element may be comprised, in whole or in part, of text, but is not solely comprised of text. Some examples of super-elements, without limitation, are images with metadata, such as images with captions; bulleted lists; equations; annotations; tables; charts; and forms.

In some cases, the element recognition module may recognize a super-element solely from the image data contained in the image or composite image. In some cases, the element recognition module may also use other information, including information generated by other modules, such as the document type module 240. For example and without limitation, and as explained in more detail below, if the document type module 240 identifies the images as containing slides in a presentation, the element recognition module may use this information to recognize text and graphics as elements common to presentations, like slides or charts, and not just as a series of unrelated text and images. As another example and again without limitation, if the document type module 240 identifies part of the image as a spreadsheet or table, the element recognition module may use this information to recognize numbers and text as part of a table, not just as a series of unrelated numbers, text, and white space.

The element recognition module 245 may recognize numerous super-elements in addition to text and simple images. The following paragraphs discuss some of these super-elements in detail.

Some possible super-elements are graphics or images that contain metadata. For example, the element recognition module 245 may recognize a graphic or image and a caption associated with the graphic or image. The recognized super-element in this case might be a captioned graphic. In this context, the recognized graphic or image is a part of the image used for soft copy document generation. For example, an image of a magazine page provided by the image acquisition module 220 might contain text as well as graphics or images, such as photographs printed on the magazine page. Some of the super-elements in this case might be the photographs on the magazine page, with any associated captions.

Another possible super-element might be a table or spreadsheet. Tables or spreadsheets might be recognized, for example and without limitation, in cases when images of a printed spreadsheet are used. They might also be recognized in other cases, such as when an image of a magazine page that contains tables is used. Where the element recognition module 245 identifies tables or spreadsheets, it may generate soft copy tables or spreadsheets, perhaps according to a user choice. For example, if a printed spreadsheet is photographed, the user may choose to generate a soft copy spreadsheet document. Alternatively, if a magazine page with tables is photographed, the user may choose to generate a soft copy word processor document with embedded tables. Beyond recognition of tables or spreadsheets, the element recognition module may be able to impute logic in the soft copy spreadsheet, table, or other element it generates. For example, a photograph of a spreadsheet with cells containing the numbers 1, 1, and 2 may not simply be recognized as a spreadsheet with three cells containing the literal values 1, 1, and 2. Instead, the third cell—the cell that contains 2—may be generated so that it contains a formula summing the previous two cells. For example, assuming the first two cells are named A1 and B1, the cells in the generated soft copy spreadsheet might contain 1, 1, and a formula like "=SUM(A1:B1)".

Another possible super-element might be a portion of a form. In this context, a "form" is part of a document that contains some known fields or structure. Using these known fields or structure, the element recognition module 245 may be able to recognize specific elements of a hard copy document. When these specific elements are recognized, the document generation system 210 may use them to generate a soft copy document, like a word processor document. Recognized elements may also be used to, for example, update a database. The element recognition module may also have the ability to improve recognition accuracy by ignoring text or other markings outside the context of the known data on the form.

Forms may follow any format and contain any fields. Some examples of forms are facsimile transmittal forms, business cards, and the like, as well as custom or user-defined forms. In the case of a facsimile transmittal form, the element recognition module 245 may look specifically for fields such as "To," "From, " "Fax Number," "Subject," and so on. In the case of a business card, the element recognition module may look for text that contains the name of a person, the name of position (such as "President,"), the name of a company, and so on. In both examples, in addition to or in lieu of generating a soft copy document, a database—for example, a database of sent or received facsimiles, or a database of contacts like that maintained by personal organizer or customer relationship management software—may be updated with the data recognized in the hard copy document.

In addition, the element recognition module may provide the ability to recognize the fields or structure of custom or user-defined forms. In such a system, a user may provide a template that denotes information like the name and location of specified fields. The element recognition module 245 may use this template to recognize elements in associated hard copy documents. One situation in which this type of functionality may be useful is in digitizing survey information that exists in hard copy form. A survey company, for example, might print paper copies of a survey with elements like checkboxes, multiple choice questions, and free text entry questions. They might also create a template in a form required by the element recognition module which names the questions, specifies the format of the questions, and so on. Given this template, the element recognition module might then interpret images of completed hard copy survey forms and, perhaps in concert with the document generation module 260, for example, might update a database with the answers to the survey questions.

Many types of documents might also contain a number of different super-elements that do not, in and of themselves, exist as a single document. Like with other super-elements, these super-elements may be made part of the generated soft copy document in such a way that they can be manipulated in an application as a super-element. For example, the element recognition module 245 may recognize a set of text as a bulleted list and enable the document generation system to generate, for example, a word processor document that contains a bulleted list, rather than simply rows of text. When such a word processor document is edited in a word processor application, the word processor can manipulate the bulleted list as a bulleted list, instead of, for example, as rows of text preceded by a graphic that looks like a text bullet.

Similar to how a bulleted list is recognized and output in a generated soft copy document, the element recognition module 245 may also recognize other super-elements including, without limitation, equations and charts, in addition to other super-elements, like tables and spreadsheets, which can be embedded in a soft copy document.

In the case of a chart or graphic, it may be possible for the element recognition module 245 to impute additional meaning to the elements of the chart or graphic. For example, an image might contain an organizational chart that shows the reporting relationship of people in a company. This chart might be comprised of squares containing text and lines that join the squares. In some instances, the element recognition module might recognize this chart as a single atomic graphic and do no further recognition. In other instances, the element recognition module might recognize the chart as a drawing with squares, lines, and text, and enable the editing of the resulting soft copy drawing in, for example, an application with graphics editing functionality. In yet other instances, the element recognition module might recognize the chart as an organizational chart, and enable editing of the resulting soft copy chart in an application with specific functionality directed toward the creation and editing of organizational charts.

The element recognition module 245 may be able to recognize handwritten text or other figures. Such handwritten elements of the hard copy may be recognized as graphics or images and not further interpreted. In other instances, handwritten content may be recognized as text. In either case, the recognized super-element may be output as part of the generated document as an annotation or note, or as part of the document itself. For example, when the element recognition module interprets an image of a page of printed text with some handwritten notes, it may incorporate the recognized handwritten text into the document itself. In other cases, it may interpret the handwritten text but keep it separate from the main flow of the document—for example, by using "Note" or "Annotation" functionality in the generated soft copy document. Handwritten drawings may be maintained as graphics or images and not further interpreted, or may be interpreted, for example, in the same way a printed chart or other super-element is recognized.

Throughout the recognition of elements, the element recognition module 245 may maintain specific features of the recognized elements. For example, the element recognition module may recognize the following features of text, without limitation: font name, font style (bold, underline, and so on), font size, text color, and so on. For elements in general, the element recognition module may recognize features, again without limitation, like color and shape.

In some instances, the element recognition module 245 may not be able to recognize some elements automatically with some sufficient or defined level of certainty. In such instances, the recognition choices module 250 may be used to present the user with a choice between multiple possible elements. For example and without limitation, if the element recognition module determines that there is a 60% chance that particular element should be recognized as one element, and a 40% chance that the element should be recognized as another element, the recognition choices module may enable the user to choose between the two likely elements. In one implementation, the recognition choices module 250 may display a dialog that shows the relevant part of the image being processed by the element recognition module, as well as the elements that have been identified by the element recognition module as possible matches, perhaps with the most likely element selected by default. The user may then choose between the presented options, and the document generation system 210 may use the selected option to determine which element to include in the generated soft copy document.

If the document generation system 210 is used in a batch or automated fashion—for example, to generate soft copy documents from a large set of images—any operation of the recognition choices module 250 or, for that matter, any operation of a module that requires user input, may be automated so that no user input is required. In one implementation, in the case of element recognition, instead of using the recognition choices module, the most likely candidate element may be chosen automatically, even if there is only, for example, a 51% chance that the most likely candidate element is the correct element.

The background module 235 identifies and manipulates background images or data present in the images being processed. For example, each slide in a hard copy presentation with multiple slides might have the same background. The background module may identify this background so that it can be manipulated separately from the text or other elements in the foreground of the slide. For example, it might identify and remove any background image or images before using modules like the element recognition module, and may then add the background image or images to the generated soft copy document after element recognition is complete. When multiple images have the same background image or images, the background module may identify the background image or images by using multiple images, for, by example, deducing that similar elements occurring in all of the images are part of the background.

Given the operations of other modules, the document generation module 260 generates one or more soft copy documents, of one or more document formats. For example, the document generation module may generate one or more word processor documents, spreadsheet documents, presentation documents, text documents, portable document format documents, and so on. A word processor document may be, for example and without limitation, a Microsoft Word document, suitable for use in the Microsoft Word application, which is produced by Microsoft Corporation of Redmond, Wash. Such a word processor document might also be suitable for use in any other application which can view or edit Microsoft Word documents. A spreadsheet document may be, for example and without limitation, a Microsoft Excel document, suitable for use in the Microsoft Excel application, also produced by Microsoft Corporation of Redmond, Wash. Similarly, a presentation document may be a Microsoft PowerPoint document and a portable document format document might be a Portable Document Format (PDF) document, suitable for use with an Adobe Acrobat application, produced by Adobe Systems Corporation of San Jose, Calif.

The particular document format or formats used by the document generation module may be determined in various ways. For example, they may be determined automatically by the document generation system 210, or may be the result of user choice. In some implementations, the document generation system 210 may default to generating a word processor document when the recognized elements include text. In other implementations, the user may choose the type or types of documents to be generated.

The document generation module 260 may generate a single soft copy document with multiple pages, or multiple documents each with a single page, or multiple documents with one or more pages, depending on the nature of the images from which the documents are generated, user choice, or other input.

Generated soft copy documents may be the same as any other soft copy documents of the same particular format. Such documents may be manipulated, transmitted, or otherwise used in any manner, in the same fashion as soft copy documents generated, for example, from scratch using an appropriate application.

In addition to generating traditional soft copy documents, in some implementations the document generation module 260 might also take other actions with the information produced by the document generation system 210. For example, instead of or in addition to generating a word processor document, the document generation module might also update a database, send email, or take any other action based on the nature of the recognized information.

Figure 3:
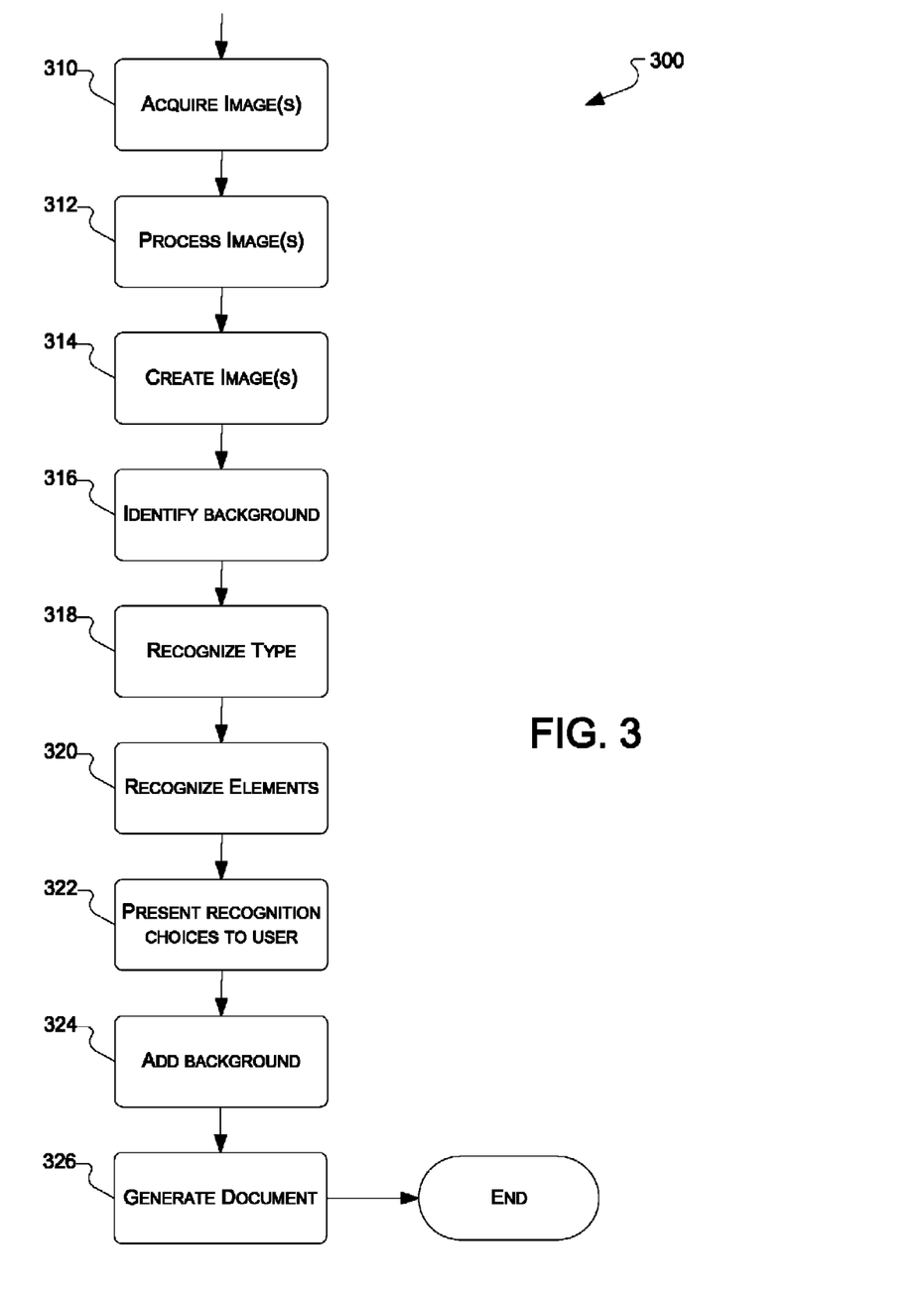
FIG. 3 is an illustration of an exemplary operational flow that includes various operations that may be performed when generating documents.

Turning now to FIG. 3, illustrated therein is an exemplary generalized operational flow 300 including various operations that may be performed when generating documents. The following description of FIG. 3 is made with reference to the system 200 of FIG. 2. However, it should be understood that the operational flow described with respect to FIG. 3 is not intended to be limited to be used with the elements of the system 200. In addition, it should be understood that, while the exemplary operational flow 300 indicates a particular order of operation execution, in one or more alternative implementations the operations may be ordered differently. Furthermore, while the exemplary operational flow contains multiple discrete steps, it should be recognized that in some implementations, some or all of these operations may be combined or executed contemporaneously.

As shown, in one implementation of operation 310, the image acquisition module 220 acquires one or more images of the hard copy document or documents from which the soft copy document or documents are to be generated. In some implementations, this operation involves taking one or more photographs of the hard copy document or documents. In other implementations, this operation involves scanning hard copy documents using a scanner, and so on. If the image acquisition module cannot acquire single images with sufficient quality for document generation, this operation may require acquiring multiple images of the hard copy document which may then be further manipulated in succeeding operations, like operation 314, where multiple images may be combined to form a single composite image.

In some implementations of operation 310, the image feedback module 255 may provide feedback to the user while images are acquired. For example, if a user takes multiple photographs of a single page of a hard copy document using a digital camera, the image feedback module may indicate to the user which parts of the hard copy page have not yet been photographed, or have not yet been photographed with sufficient detail to enable document generation.

In one implementation of operation 312, the image processing module 225 processes the images acquired in operation 310 to improve the quality of the images for use in generating soft copy documents. This image processing may include removal of keystone effects, removal or minimization of shadows, and so on. In other implementations, this operation may be performed using the composite image or images generated by operation 314—in such implementations, operation 312 may be performed after operation 314, or may be performed, at least in part, both before and after operation 314.

In one implementation of operation 314, the image creation module 230 may combine multiple images acquired during operation 310 into one or more composite images that better represent a page or section of a hard copy document. For example, when multiple images of a single page have been acquired in operation 310 to ensure that the resolution of the images is high enough to enable document generation, this operation may combine the images and create a single composite image. In instances where a single image acquired in operation 310 has sufficient resolution to enable document generation, this operation may generate a composite image that is the same as the acquired or the processed image. In an alternative embodiment, when a single image is sufficient for document generation, this operation may not be necessary and subsequent operations may work with the image acquired in the acquire images operation 310 or the process images operation 312. Further, unless otherwise noted, the composite image or images generated by this operation may be used interchangeably with images acquired in the acquire images operation 310, or processed by the process images operation 312.

In an implementation of operation 316, the background module 235 may use one or more images resulting from operations 310, 312, and 314 to identify background graphics, images, or other content. In at least one implementation, operation 316 may also remove the identified background from the images to be used by some subsequent operations, like the recognize elements operation 320. In such an implementation, the background may then be added to the soft copy documents, for example, in the add background operation 324.

In one implementation of operation 318, the document type module 240 may recognize the type of or types of hard copy documents or sections represented by the images. Information about the type or types of documents or sections may be used in subsequent operations, including, for example, the recognize elements operation 320.

In an implementation of operation 320, the element recognition module 245 recognizes text and other elements, including "super-elements," all as explained previously with reference to the element recognition module 245. This operation may recognize, for example and without limitation, text, simple images, images with captions or other additional data, bulleted lists, equations, annotations, tables, spreadsheets, presentations, charts, forms, and so on.

In one implementation of operation 322, the recognition choices module 250 may present one or more choices to the user for elements which cannot be recognized automatically with some sufficient level of certainty, to enable the user to choose the most appropriate element. In other implementations, such as implementations where large numbers of hard copy documents are processed without human intervention, this operation may not be executed.

In an implementation of operation 324, background graphics, images, or other content that was identified and removed, for example in identify background operation 316, may be added by the background module 235 to the soft copy document or documents to be generated.

Finally, in one implementation of operation 326, the document generation module 260 may generate one or more soft copy documents using the information acquired in previous operations. As explained previously with reference to the document generation module 260, the generated soft copy documents may be of many forms. Furthermore, also as explained previously, the document generation module may also perform actions aside from generating traditional documents, including, for example, updating databases using the information identified in previous operations.

Although some particular implementations of systems and methods have been illustrated in the accompanying drawings and described in the foregoing Detailed Description, it will be understood that the systems and methods shown and described are not limited to the particular implementations described, but are capable of numerous rearrangements, modifications and substitutions without departing from the spirit set forth and defined by the following claims.

We claim:

1. A method for generating a soft copy document from a hard copy document, comprising:
   acquiring via photographs taken by a user at least two images of a single page of the hard copy document;
   providing feedback to the user indicating any parts of the single page not photographed and further indicating any of the at least two images that are of insufficient quality for generating the soft copy document;
   processing the acquired images to be better suited for soft copy document generation;
   combining the processed images resulting in a composite image that represents the single page of the hard copy document;
   recognizing one or more particular text elements in the composite image;
   identifying, by a document type module, one or more document types of the composite image, wherein the document type module is configured for identifying a plurality of document types including a word processor document type, a spreadsheet document type, a presentation document type, and form types of forms including business cards, facsimiles, and a form complying with a pre-defined template;
   recognizing further particular text elements in the composite image according to characteristics of the identified one or more document types;
   generating the soft copy document as at least one of the identified one or more document types, the soft copy document including the recognized one or more particular text elements and the recognized further particular text elements; and
   wherein the method is performed by one or more computing devices.

2. The method of claim 1, wherein the processing step further comprises one or more of the following operations:
   removing keystone effects from the two or more images; and
   removing shadowing from the two or more images.

3. The method of claim 1, wherein the processing step further comprises increasing a resolution of at least one of the images.

4. The method of claim 1, wherein the recognizing particular elements step further comprises:
   if a particular element cannot be identified with a defined level of certainty, presenting to a user one or more selectable choices for the particular element;
   receiving a selected choice of the one or more selectable choices; and
   recognizing the particular element as the selected choice.

5. The method of claim 1, further comprising:
   identifying one or more background images in the composite image;
   removing the background images before recognizing elements; and
   adding the background images to the soft copy document after recognizing elements.

6. The method of claim 1, wherein the steps of processing the images, creating the composite image, recognizing elements, and generating the soft copy document are performed automatically without human intervention.

7. The method of claim 1, wherein the step of acquiring the images further comprises taking two or more photographs of the one or more hard copy documents using a digital camera.

8. The method of claim 7, wherein the digital camera further comprises a camera integrated with a mobile telephone.

9. The method of claim 1, wherein the step of acquiring the images further comprises scanning the one or more hard copy documents using a device with document scanning functionality.

10. A device, comprising:
    a memory;
    a document generation module implemented at least in part in the memory and configured for generating a soft copy document from a hard copy document;
    an image acquisition module configured for acquiring via photographs taken by a user at least two images of a single page of the hard copy document;
    an image feedback module configured for providing feedback to the user indicating any parts of the single page not photographed and further indicating any of the at least two images that are of insufficient quality for generating the soft copy document;
    an image processing module configured for processing the acquired images to be better suited for soft copy document generation;
    an image creation module configured for combining the processed images resulting in a composite image that represents the single page of the hard copy document;
    a document type module configured for identifying one or more document types of the composite image, wherein the document type module is configured for identifying a plurality of document types including a word processor document type, a spreadsheet document type, a presentation document type, and form types of forms including business cards, facsimiles, and a form complying with a pre-defined template;
    an element recognition module configured for recognizing one or more particular text elements in the composite image according to characteristics of the identified one or more document types; and
    wherein at least one of the modules is configured to operate on the device.

11. The device of claim 10, wherein the device further comprises a mobile telephone.

12. The device of claim 10, wherein the image acquisition module is further configured to acquire images generated by a second device.

13. The device of claim 12, wherein the second device includes document scanning functionality.

14. The device of claim 10, further comprising an image feedback module configured to provide feedback to a user acquiring the images, said feedback indicating that an image of at least a portion of the hard copy document has not been satisfactorily acquired.

15. One or more data storage devices that are not signal or carrier wave comprising computer-executable instructions that, when executed by a computer, cause the computer to perform a method comprising:
    acquiring via photographs taken by a user at least two images of a single page of a hard copy document;
    providing feedback to the user indicating any parts of the single page not photographed and further indicating any of the at least two images that are of insufficient quality for generating the soft copy document;
    processing the acquired images to be better suited for soft copy document generation;
    combining the processed images resulting in a composite image that represents the single page of the hard copy document;
    recognizing particular text elements in the composite image;

identifying, by a document type module, one or more document types of the composite image, wherein the document type module is configured for identifying a plurality of document types including a word processor document type, a spreadsheet document type, a presentation document type, and form types of forms including business cards, facsimiles, and a form complying with a pre-defined template;

recognizing further particular text elements in the composite image according to characteristics of the identified one or more document types; and generating the soft copy document as at least one of the identified one or more document types, the generated soft copy document including the recognized particular text elements and the recognized further particular text elements.

16. The one or more data storage devices of claim 15, wherein the processing step further comprises one or more of the following operations:

removing keystone effects; and removing shadowing.

17. The one or more data storage devices of claim 15, wherein the processing step further comprises increasing the resolution of at least one of the images.

18. The one or more data storage devices of claim 15, wherein the creating step further comprises joining two or more images to create the composite image.

* * * * *